United States Patent
Schulmeister

(10) Patent No.: US 8,995,015 B2
(45) Date of Patent: Mar. 31, 2015

(54) METHOD OF PRINTING

(71) Applicant: manroland AG, Offenbach am Main (DE)

(72) Inventor: Peter Schulmeister, Pfaffenhofen (DE)

(73) Assignee: manroland AG, Offenbach am Main (DE)

(*) Notice: Subject to any disclaimer, the term of this patent is extended or adjusted under 35 U.S.C. 154(b) by 0 days.

(21) Appl. No.: 13/738,088

(22) Filed: Jan. 10, 2013

(65) Prior Publication Data

US 2013/0113850 A1 May 9, 2013

Related U.S. Application Data

(63) Continuation of application No. 12/667,207, filed as application No. PCT/EP2008/005063 on Jun. 24, 2008, now abandoned.

(30) Foreign Application Priority Data

Jun. 29, 2007 (DE) .......................... 10 2007 030 374

(51) Int. Cl.
*G06F 15/00* (2006.01)
*B41J 3/54* (2006.01)
*G06K 15/10* (2006.01)
*B41M 3/00* (2006.01)

(52) U.S. Cl.
CPC ............... *B41J 3/546* (2013.01); *G06K 15/102* (2013.01); *B41M 3/008* (2013.01)
USPC ................................ 358/1.9; 358/1.2; 358/1.4

(58) Field of Classification Search
USPC ....................... 358/1.1, 1.2, 1.4, 1.9, 401, 296
See application file for complete search history.

(56) References Cited

U.S. PATENT DOCUMENTS 6,938,972 B2    9/2005   Booth et al. .................... 347/14

FOREIGN PATENT DOCUMENTS

| GB | 2 372 898 | | 9/2002 |
| JP | 2002361833 A | | 12/2002 |
| JP | 2006-076021 | | 3/2006 |
| JP | 2006076021 A | * | 3/2006 |
| WO | WO 2006/027212 | | 3/2006 |

OTHER PUBLICATIONS

Office Action dated Jan. 22, 2015 issued in the corresponding Korean Patent Application No. 10-2010-7000451.

* cited by examiner

*Primary Examiner* — Thomas D Lee
(74) *Attorney, Agent, or Firm* — Cozen O'Connor

(57) ABSTRACT

A method for printing on a substrate, wherein the substrate is printed upon with a plate-based printing process, particularly with an offset printing process, and with a plateless printing process, particularly with an inkjet printing process, inline with the plate-based printing process. According to the invention, a printing resolution of the plateless printing process is determined depending on a printing speed of the plate-based printing process.

16 Claims, 3 Drawing Sheets

METHOD OF PRINTING

CROSS REFERENCE TO RELATED APPLICATIONS

This is a continuation application of Ser. No. 12/667,207, which was filed with the U.S. Patent and Trademark Office on 29 Dec. 2009, which in turn is a U.S. national stage of International Application No. PCT/EP2008/005063, filed on 24 Jun. 2008. Priority is claimed based on German Application No. 10 2007 030 374.4, filed on 29 Jun. 2007.

FIELD OF THE INVENTION

The invention is directed to a method of printing on a substrate with a plate-based and a plateless printing process inline with the plate based printing process.

BACKGROUND OF THE INVENTION

Inkjet printing units which do not use printing plates are increasingly used in printing plate-based printing presses, mainly printing presses working on the principle of offset printing, e.g., in web-fed rotary offset printing presses and sheet-fed printing presses. These plateless inkjet printing units are used particularly for individualizing printed products produced by offset printing, e.g., with barcodes, numbering or other markings. Inkjet printing units of this kind have at least one inkjet printing head which can be designed to work on the principles of a continuous inkjet, drop-on-demand inkjet, thermal inkjet, bubble inkjet, or any other inkjet principle.

The maximum printing speed of inkjet printing units is appreciably less than the maximum printing speed of offset printing units. As a result there are difficulties involved in inline printing on a substrate by offset printing and inkjet printing.

To increase the achievable printing speed of inkjet printing units, it is known on the one hand to use inkjet printing units having a plurality of inkjet printing heads, namely, a plurality of inkjet printing heads positioned transverse to the transporting direction of the substrate or transverse to the printing direction and on the other hand to use a plurality of inkjet printing heads in the transporting direction of the substrate or in the printing direction where the plurality of inkjet printing heads being arranged next to one another in the shape of an array or matrix.

Although the printing speed of inkjet printing processes can be increased in this way, it has not been possible thus far in a web-fed rotary offset printing press designed, e.g., as a newspaper printing press operating at printing speeds for plate-based offset printing of up to 15 m/s to print on a substrate inline with a plateless inkjet printing process because the maximum achievable printing speed in conventional inkjet printing processes is 5 m/s. Consequently, when printing on a substrate with a plate-based printing process and, inline with the plate-based printing process, with a plateless inkjet printing process, the print image applied by using the inkjet printing process is subject to distortion. Accordingly, there is a need for a method for printing on a substrate by means of which the substrate can be printed upon at high printing speeds of more than 5 m/s inline or simultaneously with a plate-based printing process and a plateless inkjet printing process, specifically without the risk that a print image to be applied using the inkjet printing process is subject to distortion. A similar problem occurs, for example, when laser printing is used as a plateless printing method.

It is an object of the present invention to provide a novel method for printing on a substrate. This and other objects and advantages are achieved by a method in accordance with the invention, in which the printing resolution of the plateless printing process is determined depending on a printing speed of the plate-based printing process. In accordance with the present invention, the printing resolution of the plateless printing process, i.e. the inkjet printing process, is determined depending on the printing speed of the plate-based printing process, i.e. the offset printing process. The higher the printing speed of the plate-based printing process compared to the maximum printing speed of the plateless printing process at which printing can be performed at maximum printing resolution, the lower the printing resolution of the plateless printing process.

Consequently, it becomes possible to operate the plateless printing process at a higher printing speed than the maximum printing speed for which it is specified without the risk of distortion of the print image to be applied using the plateless printing process.

In a preferred embodiment, a printing resolution of the plateless printing process considered transverse to the transporting direction of the substrate is independent of the printing speed of the plate-based printing process; however, a printing resolution of the plateless printing process considered in the transporting direction of the substrate is determined depending on the printing speed of the plate-based printing process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are indicated in the subclaims and the subsequent description. Embodiment examples of the invention are described more fully with reference to the drawings, in which:

DETAILED DESCRIPTION OF THE PREFERRED EMBODIMENTS

The present invention is directed to a method for printing on a substrate, where the substrate is printed on by a plate-based printing process and, inline with the plate-based printing process, by a plateless inkjet printing process. The plate-based printing process is preferably an offset printing process. The method according to the invention is preferably used in web-fed rotary offset printing presses such as, e.g., in newspaper printing presses, in order to print on a web-shaped substrate by means of the inkjet printing process inline with the offset printing within the web-fed rotary offset printing press.

In accordance with the invention, a printing resolution of the inkjet printing process is determined depending on a printing speed of the plate-based printing process, i.e. the offset printing process for inline printing on a substrate with a plate-based printing process and simultaneously with a plateless inkjet printing process. The printing resolution is preferably determined such that the printing resolution of the inkjet printing process transverse to the transporting direction of the substrate is independent of the printing speed of the plate-based printing process. However, a printing resolution of the inkjet printing process in the transporting direction of the substrate is dependent on the printing speed of the plate-based printing process.

Figure 1:
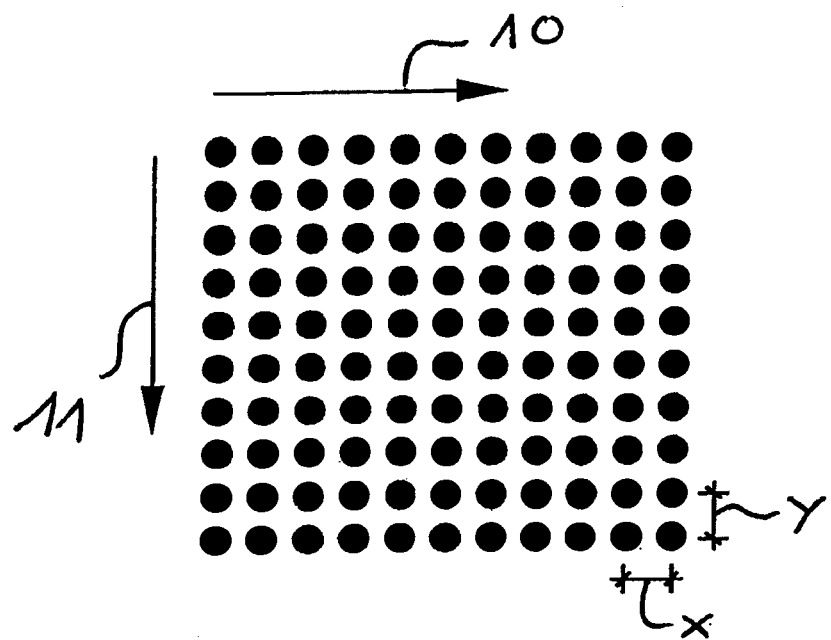
FIG. 1 is a schematic view illustrating the method according to the invention for printing on a substrate.
Figure 1:
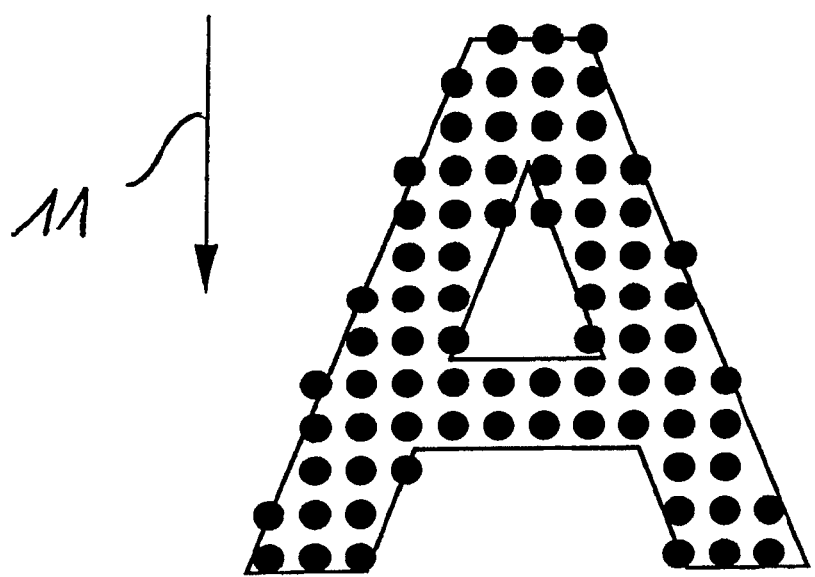

FIG. 1 is a schematic visualization of a resolution which can be achieved using a conventional inkjet printing process, where the resolution considered transverse to transporting direction of the substrate (arrow 10) and considered in the transporting direction of the substrate (arrow 11) is identical. Accordingly, considered transverse to the transporting direction of the substrate, the distance x between dots which can be printed using the inkjet printing process corresponds to the distance y between the same dots considered in the transporting direction of the substrate.

Typically, the resolution of an inkjet printing process is 240×240 dpi or 300×300 dpi. With a printing resolution of this kind which is identical considered transverse to the transporting direction of the substrate and in the transporting direction of the substrate, printing can be carried out, for example, in the manner of character A according to FIG. 1.

When the printing speed of the plate-based printing process, i.e. the offset printing process, is less than or equal to a maximum printing speed of the inkjet printing process at which printing can be performed at the maximum inkjet printing resolution, the printing resolution of the inkjet printing process in the transporting direction of the substrate and transverse to the transporting direction of the substrate corresponds to the maximum printing resolution of the inkjet printing process.

On the other hand, when the printing speed of the plate-based printing process, i.e. the offset printing process, is greater than the maximum printing speed of the plateless inkjet printing process at which printing can be performed out at maximum inkjet printing resolution, the selected printing resolution of the inkjet printing process considered in the transporting direction of the substrate is lower than the maximum printing resolution of the inkjet printing process.

When the printing speed of the plate-based printing process is greater than the maximum printing speed of the plateless inkjet printing process, the printing resolution of the inkjet printing process in the transporting direction of the substrate is determined according to the following formula:

$$DA_{inkjet} = DA_{inkjet}^{max} * \frac{v_{inkjet}^{max}}{v_{offset}},$$

where $DA_{inkjet}$ is the printing resolution of the inkjet printing process in the transporting direction of the substrate, $DA_{inkjet}^{max}$ is the maximum printing resolution of the inkjet printing process, $v_{inkjet}^{max}$ is the maximum printing speed of the inkjet printing process at which printing can be performed at maximum printing resolution $DA_{inkjet}^{max}$, and $v_{offset}$ is the printing speed of the plate-based printing process.

Accordingly, it follows from the above relationship that the printing resolution of the inkjet printing process in the transporting direction of the substrate depends on the transporting speed of the plate-based printing process, i.e. the offset printing process such that the printing resolution of the inkjet printing process is reciprocally or inversely proportional to the printing speed of the plate-based printing process.

In a particular exemplary embodiment, it is assumed that the maximum printing resolution of the inkjet printing process at a maximum printing speed of the inkjet printing process of 5 m/s is 300×300 dpi. When a substrate is to be operated with an inkjet printing process of this kind inline with a plate-based offset printing process operating at a printing speed of 15 m/s, the printing resolution of the inkjet printing process is 300 dpi transverse to the transporting direction of the substrate and 100 dpi in the transporting direction of the substrate so that the total resolution is 300× 100 dpi.

Figure 2:
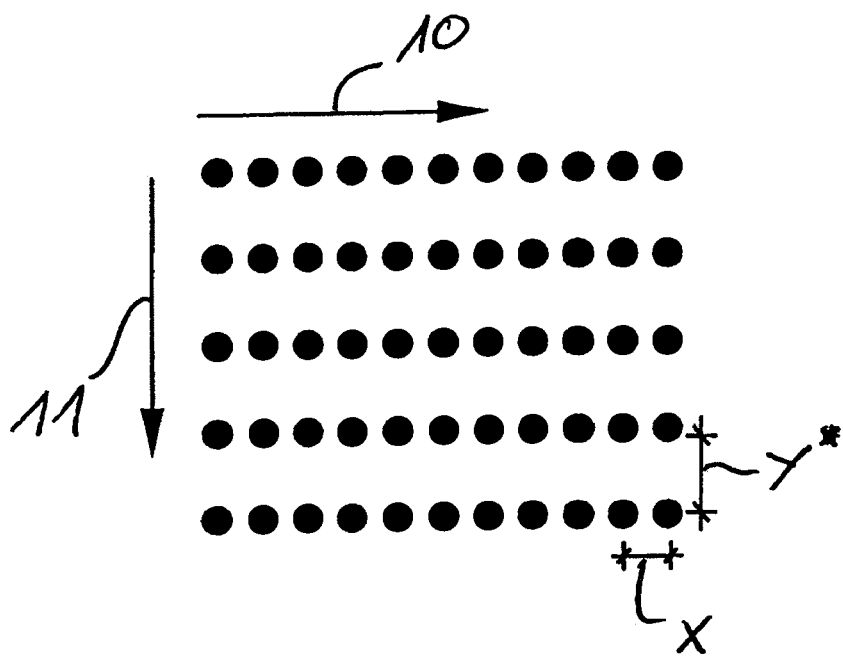
FIG. 2 is another schematic view illustrating the method according to the invention for printing on a substrate.
Figure 2:
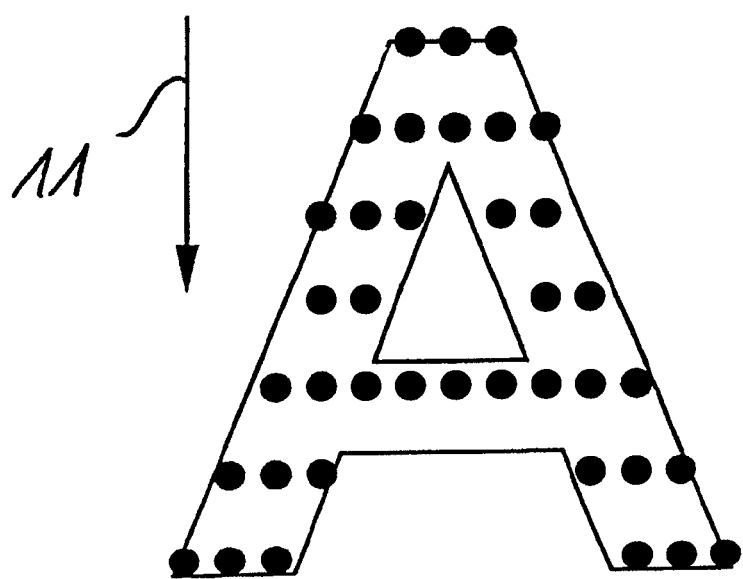

FIG. 2 shows a reduced printing resolution for the inkjet printing process. In this case, the distance x between printing dots remains unchanged considered transverse to the transporting direction (arrow 10) of the substrate, but the distance y* between the printing dots is increased in relation to the transporting direction (arrow 11) of the substrate. The character A is accordingly printed with fewer dots in relation to the transporting direction of the substrate.

In accordance with an embodiment of the invention, the printing resolution of the inkjet printing process is determined once depending on the maximum printing speed of the plate-based printing process, i.e. the offset printing process, so that the printing resolution of the inkjet printing process is constant and is accordingly independent from the actual printing speed of the plate-based offset printing process.

As a result, a uniform appearance of the print image to be printed using the inkjet printing process can be obtained over the entire speed range of the plate-based offset printing process.

In order to optimize the printing quality of the inkjet printing process, the printing resolution of the inkjet printing process can also be determined depending on the actual printing speed of the plate-based offset printing process so that the printing resolution of the inkjet printing process can accordingly be varied. That is, the printing resolution depends on the actual printing speed of the plate-based offset printing process at the current time.

By implementing the printing process according to the disclosed embodiments of the invention, it is possible to print on a substrate with a high printing quality in offset printing and inline in inkjet printing even at printing speeds above a permissible printing speed for inkjet printing processes.

The disclosed embodiments of the method of the invention can also be employed when using another plateless printing process, e.g., laser printing, inline with the plate-based printing process.

Figure 3:
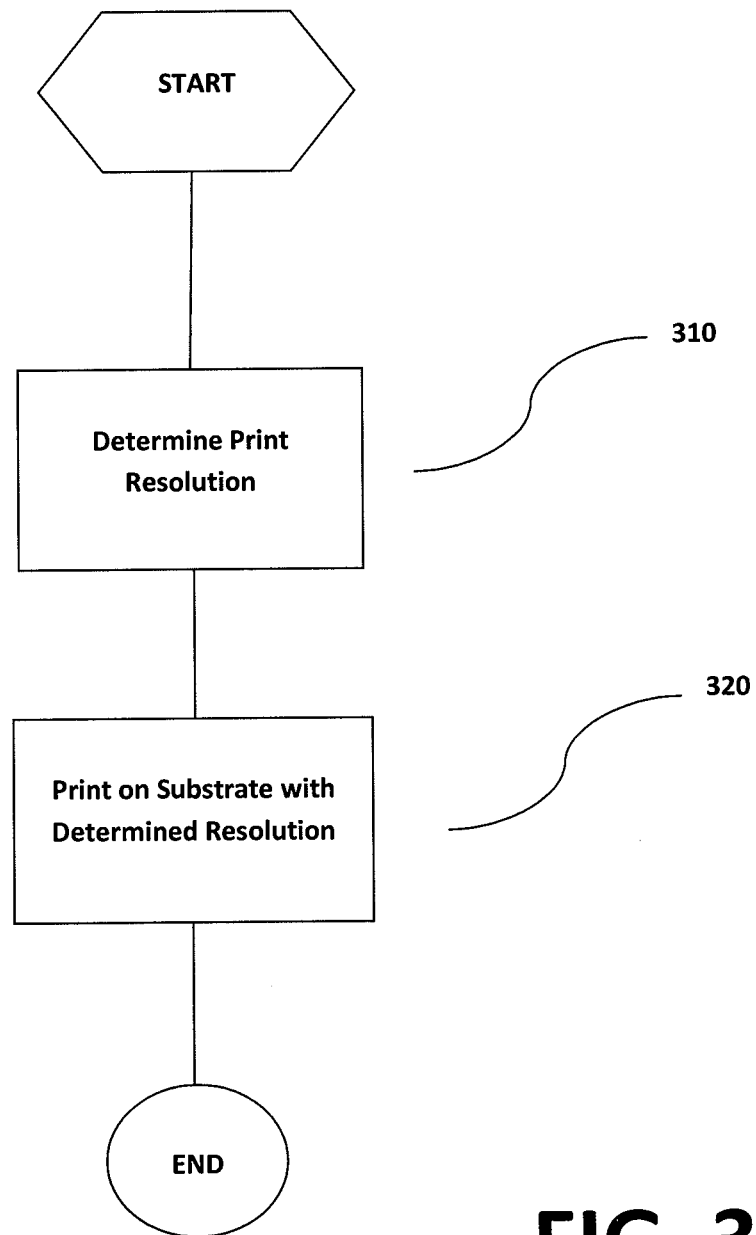
FIG. 3 is a flow chart illustrating the method for printing on a substrate in accordance with the invention.

FIG. 3 is a flow chart illustrating the steps of the method for printing on a substrate in accordance with the invention. The printing resolution of a plateless printing process is determined based on a printing speed of the plate-based printing process, as indicated in step 310. Next, printing on the substrate with a plate-based printing process and a plateless printing process inline with the plate-based printing process is performed at the determined printing resolution of the plateless printing process, as indicated in step 320.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method for printing on a substrate, wherein the substrate is printed with a plate-based printing process, particularly with an offset printing process, and with a plateless printing process, particularly with an inkjet printing process, inline with the plate-based printing process, characterized in that a printing resolution of the plateless printing process is determined, by a processor of a plateless printer, depending on a printing speed of the plate-based printing process.

2. The method according to claim 1, characterized in that a printing resolution of the plateless printing process transverse to the transporting direction of the substrate is independent from the printing speed of the plate-based printing process.

3. The method according to claim 2, characterized in that a printing resolution of the plateless printing process in the transporting direction of the substrate is determined depending on the printing speed of the plate-based printing process.

4. The method according to claim 1, characterized in that a printing resolution of the plateless printing process in the transporting direction of the substrate is determined depending on the printing speed of the plate-based printing process.

5. The method according to claim 4, characterized in that the printing resolution of the plateless printing process in the transporting direction of the substrate is determined in such a way that when the printing speed of the plate-based printing process is less than or equal to a maximum printing speed of the plateless printing process at which printing can be carried out at maximum printing resolution, the printing resolution of the plateless printing process in the transporting direction of the substrate corresponds to the maximum printing resolution of the plateless printing process.

6. The method according to claim 5, characterized in that the printing resolution of the plateless printing process in the transporting direction of the substrate is determined in such a way that when the printing speed of the plate-based printing process is greater than a maximum printing speed of the plateless printing process at which printing can be carried out at maximum printing resolution, the printing resolution of the plateless printing process in the transporting direction of the substrate is lower than the maximum printing resolution of the plateless printing process.

7. The method according to claim 5, characterized in that the printing resolution of the plateless printing process is determined depending on a maximum printing speed of the plate-based printing process so that the printing resolution of the plateless printing process is constant and is independent from an actual printing speed of the plate-based printing process.

8. The method according to claim 5, characterized in that the printing resolution of the plateless printing process is determined depending on an actual printing speed of the plate-based printing process so that the printing resolution of the plateless printing process is variable.

9. The method according to claim 4, characterized in that the printing resolution of the plateless printing process in the transporting direction of the substrate is determined in such a way that when the printing speed of the plate-based printing process is greater than a maximum printing speed of the plateless printing process at which printing can be carried out at maximum printing resolution, the printing resolution of the plateless printing process in the transporting direction of the substrate is lower than the maximum printing resolution of the plateless printing process.

10. The method according to claim 9, characterized in that when the printing speed of the plate-based printing process is greater than a maximum printing speed of the plateless printing process at which printing can be carried out at maximum printing resolution, the printing resolution of the plateless printing process in the transporting direction of the substrate is determined according to the following formula:

$$DA_{inkjet} = DA_{inkjet}^{max} * \frac{v_{inkjet}^{max}}{v_{offset}},$$

where $DA_{inkjet}$ is the printing resolution of the plateless printing process in the transporting direction of the substrate, $DA_{inkjet}^{max}$ is the maximum printing resolution of the plateless printing process, $v_{inkjet}^{max}$ is the maximum printing speed of the plateless printing process at which printing can be carried out at the maximum printing resolution $DA_{inkjet}^{max}$, and $v_{offset}$ is the printing speed of the plate-based printing process.

11. The method according to claim 10, characterized in that the printing resolution of the plateless printing process is determined depending on a maximum printing speed of the plate-based printing process so that the printing resolution of the plateless printing process is constant and is independent from an actual printing speed of the plate-based printing process.

12. The method according to claim 10, characterized in that the printing resolution of the plateless printing process is determined depending on an actual printing speed of the plate-based printing process so that the printing resolution of the plateless printing process is variable.

13. The method according to claim 9, characterized in that the printing resolution of the plateless printing process is determined depending on a maximum printing speed of the plate-based printing process so that the printing resolution of the plateless printing process is constant and is independent from an actual printing speed of the plate-based printing process.

14. The method according to claim 9, characterized in that the printing resolution of the plateless printing process is determined depending on an actual printing speed of the plate-based printing process so that the printing resolution of the plateless printing process is variable.

15. The method according to claim 1, characterized in that the printing resolution of the plateless printing process is determined depending on a maximum printing speed of the plate-based printing process so that the printing resolution of the plateless printing process is constant and is independent from an actual printing speed of the plate-based printing process.

16. The method according to claim 1, characterized in that the printing resolution of the plateless printing process is determined depending on an actual printing speed of the plate-based printing process so that the printing resolution of the plateless printing process is variable.

* * * * *